United States Patent
Sullivan (10) Patent No.: US 11,067,424 B2
(45) Date of Patent: Jul. 20, 2021

(54) PORTABLE LIQUID LEVEL GAUGE FOR BUCKETS

(71) Applicant: Scott Sullivan, San Francisco, CA (US)

(72) Inventor: Scott Sullivan, San Francisco, CA (US)

(*) Notice: Subject to any disclaimer, the term of this patent is extended or adjusted under 35 U.S.C. 154(b) by 122 days.

(21) Appl. No.: 16/403,588

(22) Filed: May 5, 2019

(65) Prior Publication Data

US 2019/0339106 A1  Nov. 7, 2019

Related U.S. Application Data

(60) Provisional application No. 62/667,615, filed on May 7, 2018.

(51) Int. Cl.
  *G01F 23/00*  (2006.01)
(52) U.S. Cl.
  CPC ............................... *G01F 23/0007* (2013.01)
(58) Field of Classification Search
  CPC .... G01F 22/00; G01F 23/2927; G01F 11/025; G01F 13/006; G01F 17/00; G01F 23/0015; G01F 23/0076; G01F 23/24; G01F 23/242; G01F 23/243; G01F 23/263; G01F 23/265; G01F 23/2845; G01F 23/292; G01F 23/2921; G01F 23/2961; G01F 23/603; G01F 3/00
  See application file for complete search history.

(56) References Cited

U.S. PATENT DOCUMENTS

| | | | | |
|---|---|---|---|---|
| 3,094,873 A | * | 6/1963 | Urshan | G01F 23/02 73/290 R |
| 4,024,644 A | * | 5/1977 | Koenig | G01F 23/2924 33/729 |
| 4,280,126 A | * | 7/1981 | White | G01F 23/2961 340/621 |
| 4,550,602 A | * | 11/1985 | Burke, Sr. | G01F 23/02 116/227 |
| 5,723,870 A | * | 3/1998 | Crowne | B64D 37/00 250/221 |
| 2001/0008084 A1 | * | 7/2001 | Mann | G01F 23/2961 73/290 V |
| 2020/0326222 A1 | * | 10/2020 | Connell | G01F 23/242 |

* cited by examiner

*Primary Examiner* — Andre J Allen (57) ABSTRACT

A portable gauge for measuring the level of a liquid or a granular solid in a container, such as a bucket, is made up of an elongated body and a slider. The body includes gauge marks, based on a specific bucket, to indicate various levels of volume. The body includes an upper end, which has downwardly directed integrally formed arms which, in combination with the body, define a saddle. The saddle is sized and shaped to comfortably capture and rest on the rim of the bucket, during use. The slider is sized and shaped to snuggly slide along the body and includes a tab portion. The slider is moved to a desired volume level so that when the added contents of the bucket reach the tab portion, the volume level of the contents will be known.

17 Claims, 9 Drawing Sheets

PORTABLE LIQUID LEVEL GAUGE FOR BUCKETS

CLAIM OF PRIORITY

This application claims priority from U.S. Provisional Patent Application No. 62/667,615 filed May 7, 2018, entitled: "Portable Liquid Level Gauge for Buckets," the contents of which are incorporated herein in their entirety.

BACKGROUND OF THE INVENTION a) Field of the Invention

The present invention relates to gauges, and more particularly, to such gauges which are portable and used to convey the volume of a liquid within a bucket.

b) Description of the Related Art

As we all know, a bucket is a watertight, vertical cylinder or truncated cone having an open top and a flat bottom. An appropriate handle is provided over the open top for allowing a user to easily carry the bucket and its contents to a location. Different size buckets are typically referred to by the maximum volume of liquid they can hold and are often available in such sizes as a quart, a half gallon, a gallon, and the classic 5 gallon bucket. Buckets can be made from any suitable, watertight material, typically plastic and metal are used. To help a user use a bucket to measure liquid, the bucket is usually provided with gauge marks. The marks may be integrally formed within the bucket material. Plastic buckets may have gauge marks formed along the bucket wall during their manufacture (injection molding process). Similarly, metal buckets may use a stamping or embossing process to provide gauge marks along the bucket wall. If plastic is used to make the bucket, the plastic may be transparent, or at least translucent so that the level of the liquid in the bucket may be seen through the bucket wall. This allows the gauge marks to be printed on the outside of the bucket. For opaque, or near opaque buckets, the gauge marks must be formed or printed along the inside wall of the bucket. Owing to conventional manufacturing processes, integrally-molding or even printing gauge marks on the inside wall of a bucket may prove to be difficult and costly.

Also, larger size buckets, such as the widely-popular 5 gallon size, gauge marks located on the inside wall will be difficult, or impossible to read owing to the vertical dimensions of this large size bucket. If the marks are printed on the inside wall of the larger buckets, the user would be forced to bend down and possibly even stick their head into the upper end of the bucket in an effort to read the gauge marks. Not only is this an uncomfortable burden to the user, it may be dangerous, since the bucket may be in use to measure chemicals that are hazardous to humans if inhaled or touched.

OBJECTS OF THE INVENTION

A first object of the invention is to provide a device that overcomes the deficiencies of the prior art.

A second object of the invention is to provide such a device that allows a user of a bucket to quickly, easily and safely determine the volume of liquid located in a bucket.

SUMMARY OF THE INVENTION

The present invention is a portable gauge made up of a elongated body and a slider. The body includes gauge marks, based on a specific bucket, to indicate various levels of liquid volume. The body includes an upper end, which has downwardly directed integrally formed arms which, in combination with the body, define a saddle. The saddle is sized and shaped to comfortably capture and rest on the rim of the bucket, during use. The slider is sized and shaped to snuggly slide along the body and includes a lip portion. A plurality of detents located along the length of the body engagingly cooperate with a spring-biased tab on the slider to provide controlled interval movement of the slider with respect to the body.

In use, the user simple holds the body comfortably in front of his or her face and slides the slider along the body until the lip portion aligns with a desired gauge mark. The plurality of detents and the slider tab help retain the position of the slider, as the user places the body into a bucket so that the body resides along the inside wall of the bucket and so that the saddle at the upper portion of the body engages with the rim of the bucket. The user may then add liquid to the bucket, as desired, until the level of the liquid aligns with the lip portion of the slider, at which point the volume of liquid within the bucket would equal the volume indicated by the slider and the aligned gauge mark. The user could then simple remove the body from the bucket.

The features of this invention, and the manner of attaining them, will become more apparent and the invention itself will be better understood by reference to the following description of the disclosed embodiments taken in conjunction with the accompanying drawings.

DETAILED DESCRIPTION OF THE PREFERRED EMBODIMENTS

By way of overview, the present invention is a new type of liquid level (and liquid volume) gauge that is useful for specific size and specific shaped utility buckets, commonly used in various industries and by various type of workers today. Applicant has determined that although this invention, described below, may be designed to fit any size bucket or container, it is best suited for conventional 5-gallon size buckets, typically sold by hardware stores, including Home Depot stores, Lowes stores, OSH stores, Menard's stores, Ace and True Value stores. These stores use these buckets as a way to further advertise their store brand after purchase, when the buckets are being used at a remote location. Each hardware store company colors their specific bucket with the company's colors or with colors that help convey the particular company's brand. For example, Home Depot colors their 5-gallon bucket a vibrant orange color. Lowes colors their bucket a dark blue. Ace and True Value uses red and white colors, while Menards uses a dark green color. The colored buckets effectively represent their respective company. When someone uses an orange 5-gallon bucket at a construction site, or even in a user's home garden, the Home Depot company is effectively being advertised.

These large buckets are made from a suitable strong and durable colored plastic. Unfortunately, these colored buckets are not very translucent, making it difficult for a user to see a liquid level through the side wall during use.

Also, although these 5-gallon buckets will each hold 5 gallons of liquid, the exact dimensions of each bucket will, in fact, vary, which means, each bucket will require unique gauge marks to ensure accuracy, as described in greater detail below.

Figures 1, 2, 3:
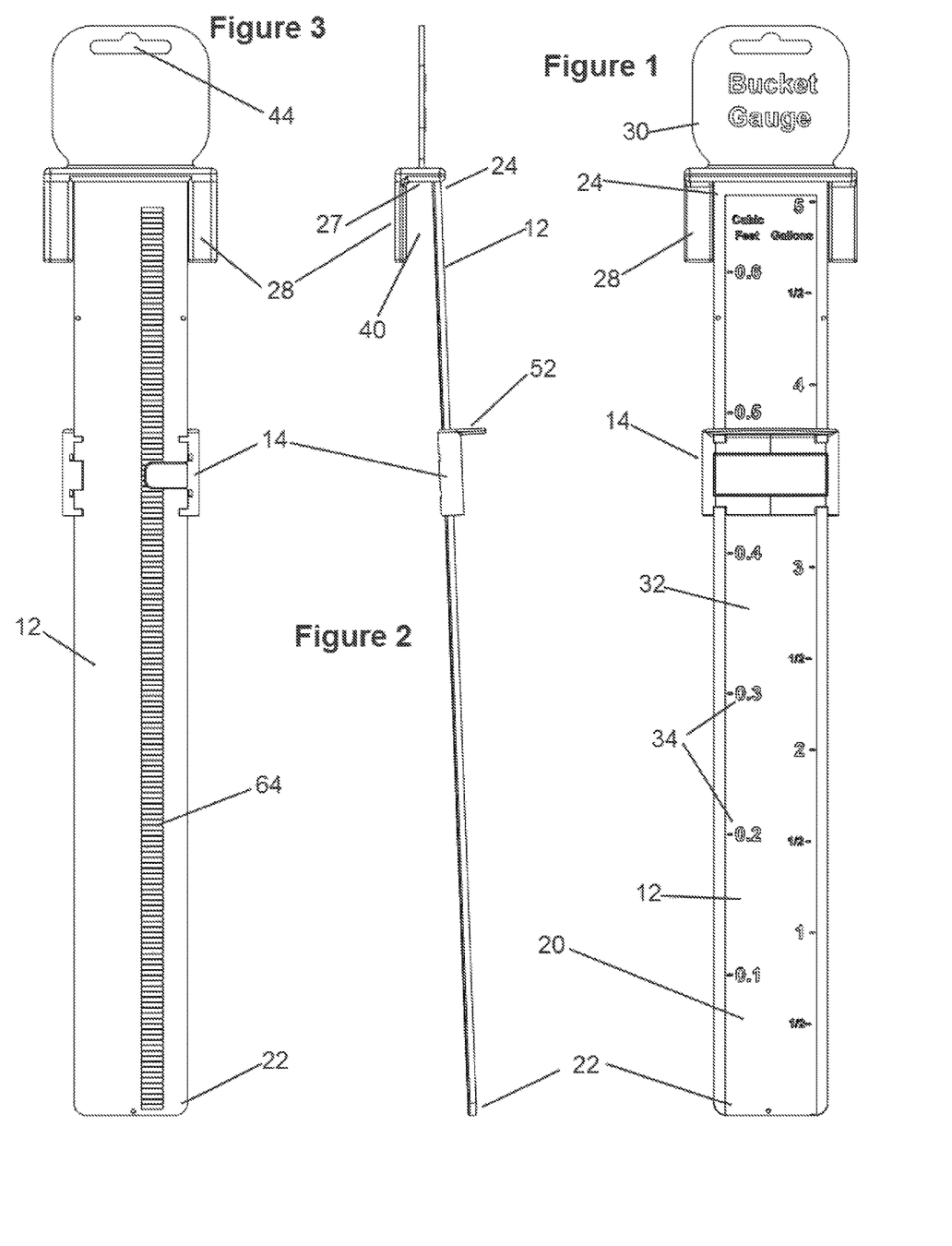
FIG. 1 is a front view of a volume gauge having a body and a slider, according to one embodiment of the present invention.
FIG. 2 is a left side view of the volume gauge of FIG. 1, according to one embodiment of the present invention.
FIG. 3 is a rear view of the volume gauge of FIG. 1, according to one embodiment of the present invention.

Referring to FIGS. 1-4, a gauge 10 is shown, according to the invention, including a body 12, and a slider 14. Body 12 is elongated and sized to fit inside a bucket 16, along a vertical wall 18, and includes a gauge surface panel 20, a lower end 22 and an upper end 24. Body 12 preferably is angled to match the tapered angle of bucket 16, as shown in FIG. 2. Bucket 16 includes an open upper end 19, defined by a circumferentially disposed rim 21. Upper end 24 of body 12 includes a rim-contact plate 26, having a rim-contacting surface 27, at least one, but preferably two downwardly-directed rim-holding arms 28 and an upwardly-directed handle 30. As shown in FIGS. 1 and 3, gauge surface panel 20 extends from lower end 22 of body 12 to rim-contact plate 26 and provides a flat surface 32 onto which gauge marks 34 may be printed, or otherwise formed.

Gauge marks 34 are preferably pad-printed onto flat surface 32 using conventional or otherwise known pad-printing techniques. The ink used is preferably a durable, long-lasting, fast drying and is colored to be easily visible against the color of flat surface 32 (e.g., white or orange text against a darker color flat surface 32, or black text against a lighter or yellow colored background). The size and font of gauge marks 34 can vary, but the end result is that the user should be able to quickly and easily read gauge marks when using the device. In this case, gauge marks 34 can be made similar in size and color as the measurement numbers used on conventional tape measure tapes.

Gauge marks 34 are positioned along the length of flat surface 32 in such a spaced manner so as to convey the volume of liquid contained within bucket 16, when gauge 10 is positioned within bucket 16. Various scales and units may be used to measure the volume of liquids, such as gallons, quarts, pints, cups, ounces, liters, milliliters, centiliters, etc.

According to the invention, flat surface 32 may support gauge marks 34 that follow one or more standards of measurement and volume. For example, flat surface 32 may have gauge marks 34 along one edge 36 that follow a first standard, such as the US customary units standard, while having different gauge marks along the opposite edge 38 that follow a second standard, such as the International System for Units (SI). In other words, gauge 10 may be provided with gauge marks that are suitable for measuring liquid volume in both US and Metric units, or other measurement standards.

Also, Applicant contemplates providing a scale of gauge marks that are designed to measure solid volumes, such as cubic inches and cubic feet. This may be helpful for measuring the volume of a powder within bucket 16, such as sand or cement.

Figure 4:
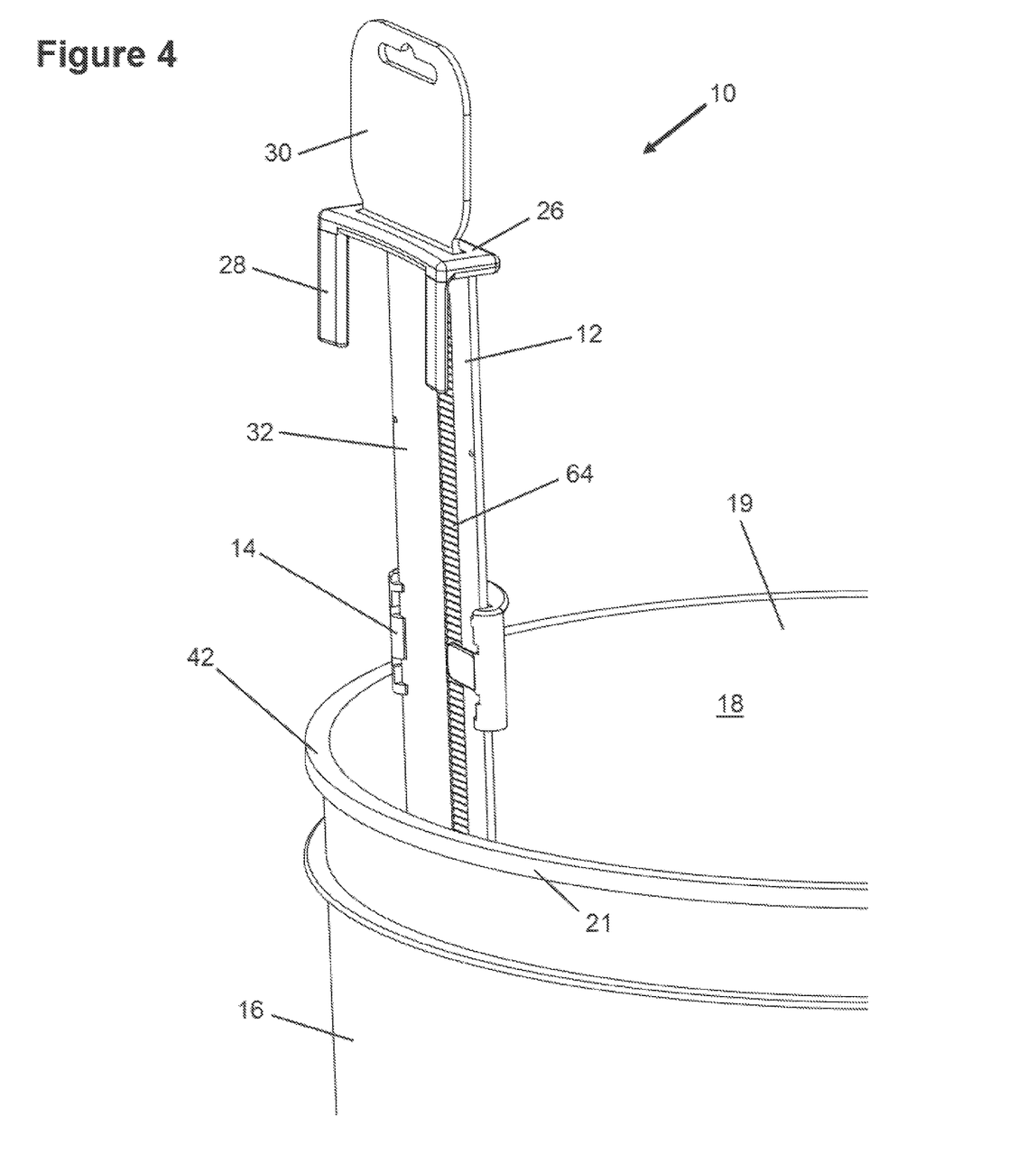
FIG. 4 is a perspective rear view of the volume gauge of FIG. 1, showing the gauge being secured to a rim of a bucket, according to one embodiment of the invention.
Figure 5:
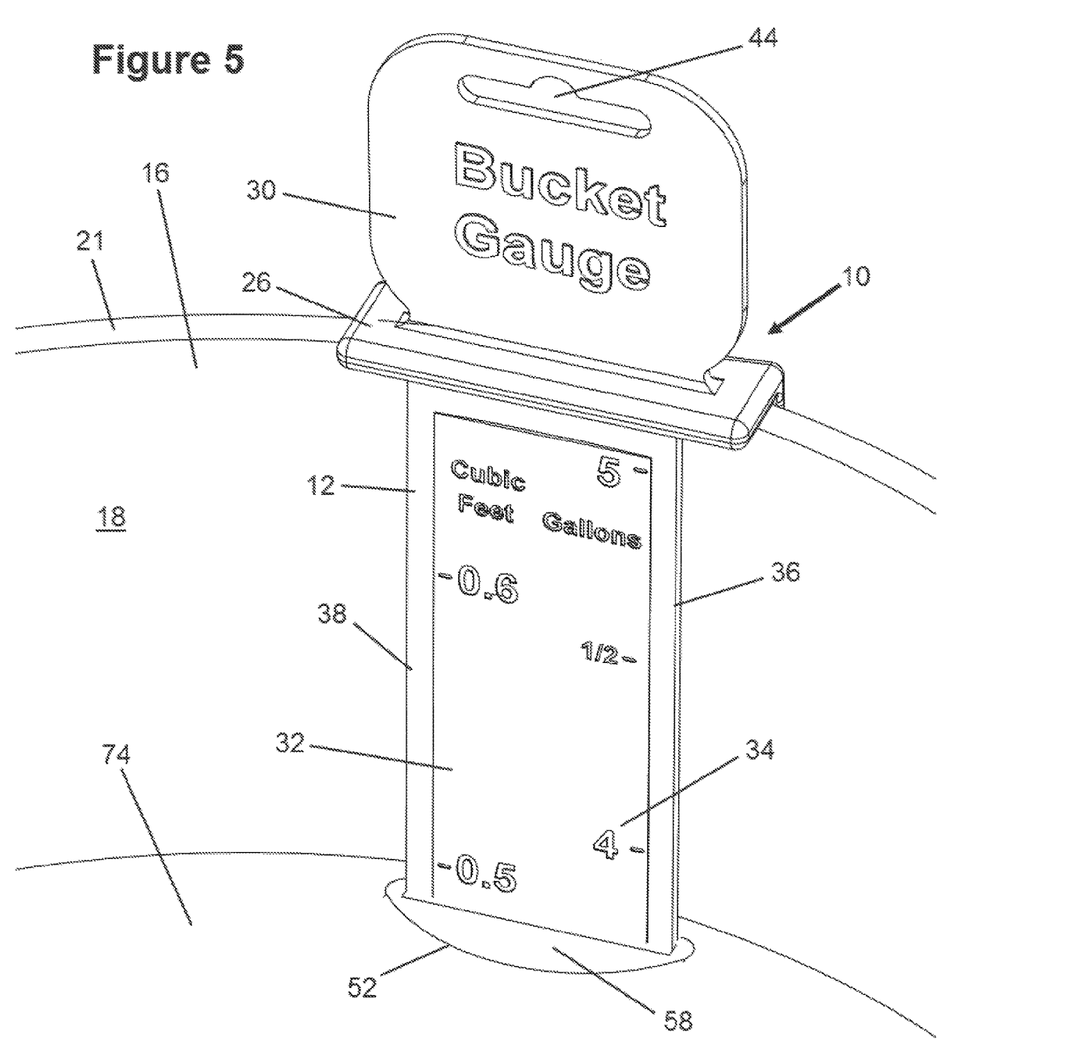
FIG. 5 is a perspective front view of the volume gauge of FIG. 1, showing the gauge secured to the rim of the bucket of FIG. 4, and showing a liquid level in the bucket equal to the height of a lip portion of the slider, according to one embodiment of the invention.
Figure 6:
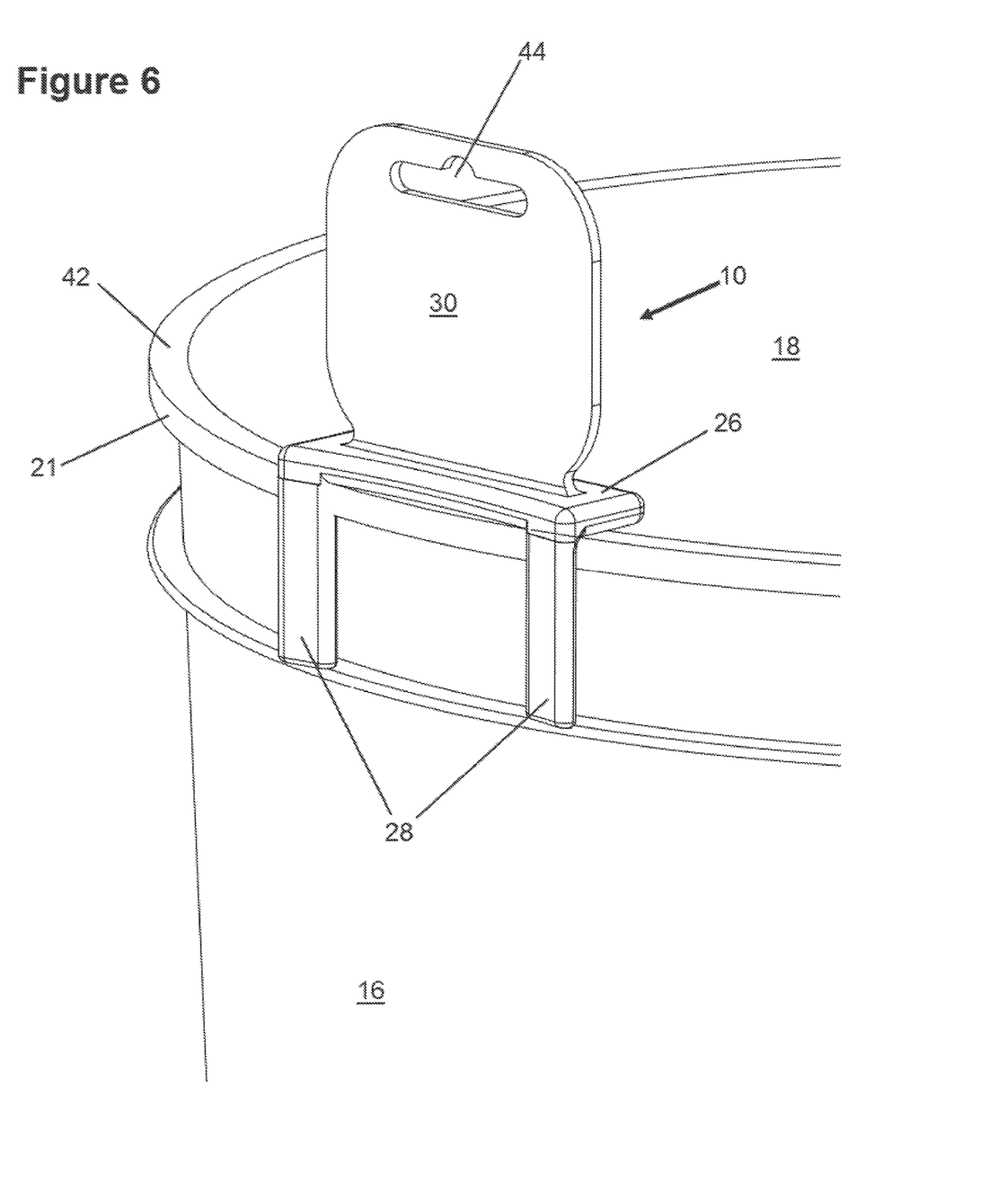
FIG. 6 is a perspective rear view of the volume gauge of FIG. 1, showing the gauge secured to the rim of the bucket, according to one embodiment of the invention.

Referring now to FIGS. 4, 5 and 6, gauge 10 is shown in relation to bucket 16. Rim-holding arms 28 are positioned from body 12 so that a rim space 40 is defined therebetween. Rim space 40 is sized and shaped to comfortably fit rim 21 of the particularly shaped bucket 16. As mentioned above, many of the conventional 5-gallon size buckets are shaped differently, including rims of differing diameter and rims having different cross-sectional shapes. Rim space 40 is therefore preferably sized somewhat loosely so that one gauge 10 will fit many or all types of 5-gallon buckets.

Figure 7:
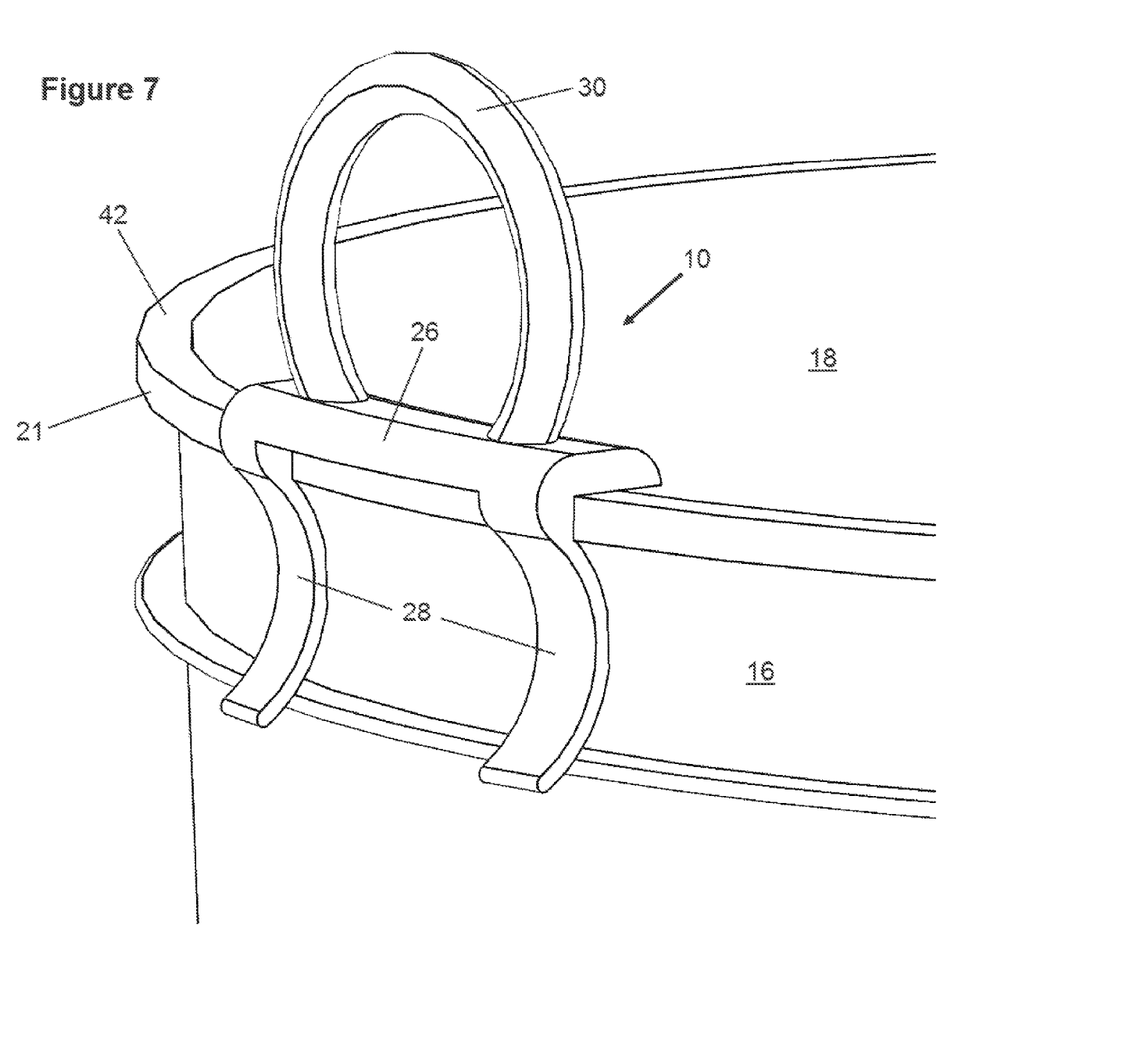
FIG. 7 is a perspective rear view of the present volume gauge, showing the gauge secured to the rim of the bucket with a clip-like arm structure, according to another one embodiment of the invention.

As shown in FIG. 7, Applicant alternatively contemplates providing rim-holding arms 28 with a spring-biased clip-action shape wherein each arm would be curved towards body 12 and then curved away from body 12, as shown. This arm shape would allow gauge 10 to clip onto rim 21 of bucket 16. However, it is preferred that arms 28 are sized and shaped to provide a loose fit about rim 21 of bucket 16, as shown in FIGS. 1-6, and described above, so that more bucket shapes can be accommodated with a single gauge 10.

As shown in FIGS. 4-6, gauge 10 is designed to be inserted easily into bucket 16, along wall 18 with arms 28 positioned outside bucket 16 adjacent to rim 21. Rim 21 of bucket 16 is actually "captured" by, or saddled between arms 28 and body 12, as shown in the figures. In use, as described in greater detail below, a top surface 42 of rim 21 is meant to contact rim-contacting surface 27 of rim-contact plate 26, as shown in FIGS. 5 and 6 when gauge 10 is attached to bucket 16. The length of body 12 of gauge 10 is such that when gauge 10 is attached to bucket 16 (so that top surface 42 contacts rim-contacting surface 27 of rim-contact plate 26), lower end 22 of body 12 does not touch the bottom of bucket 16. Depending on the design, the length of body 12 can be located any distance from the bottom of bucket 16, but preferably is sized so that lower end 22 is within an inch of the bottom of bucket 16. The actual distance between lower end 22 and the bottom of bucket 16 does not affect the accuracy of gauge 10 since all gauge marks are referenced from top surface 42 of rim 21 of bucket 16.

Once gauge 10 is positioned within bucket 16, slider 14 is allowed to slide up and down along the length of body 12, if necessary.

As shown in FIGS. 4-6, handle 30 is used as a convenient purchase point for the user to easily position and maneuver gauge 10. It also provides real estate for printing informative text and logos. Handle 30 is formed with a standard hanging hole 44.

Figure 8:
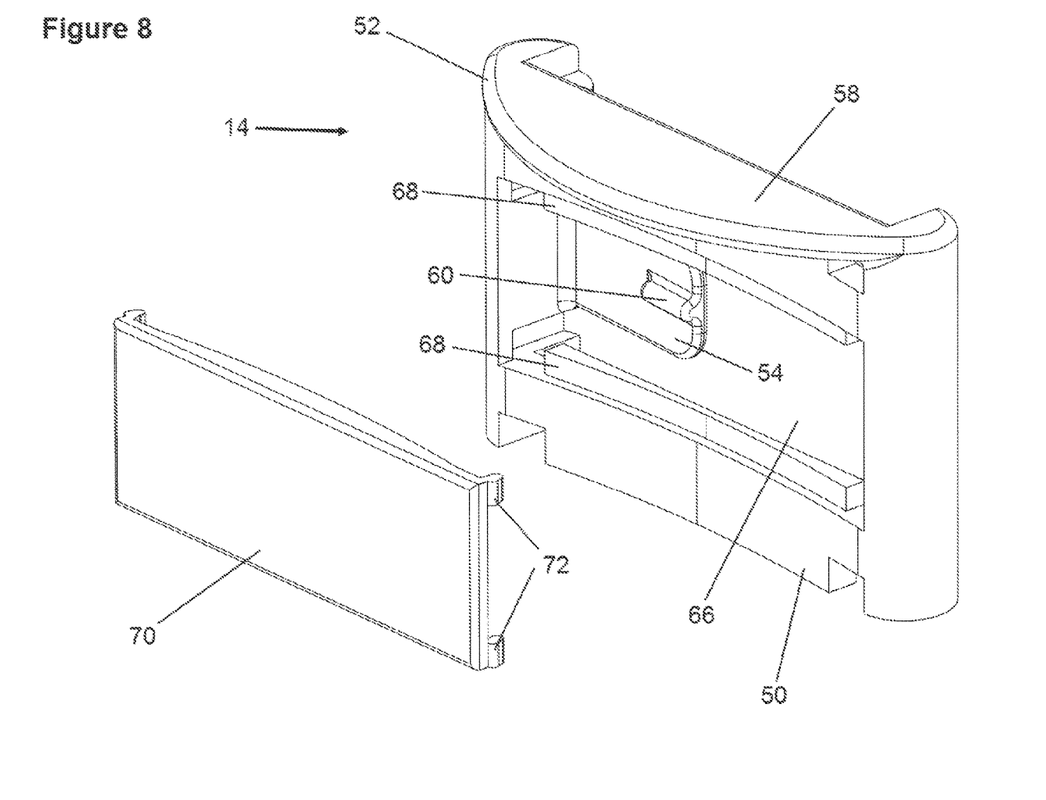
FIG. 8 is a front perspective assembly view of the slider, according to one embodiment of the invention, showing details of a removable cover plate.
Figure 9:
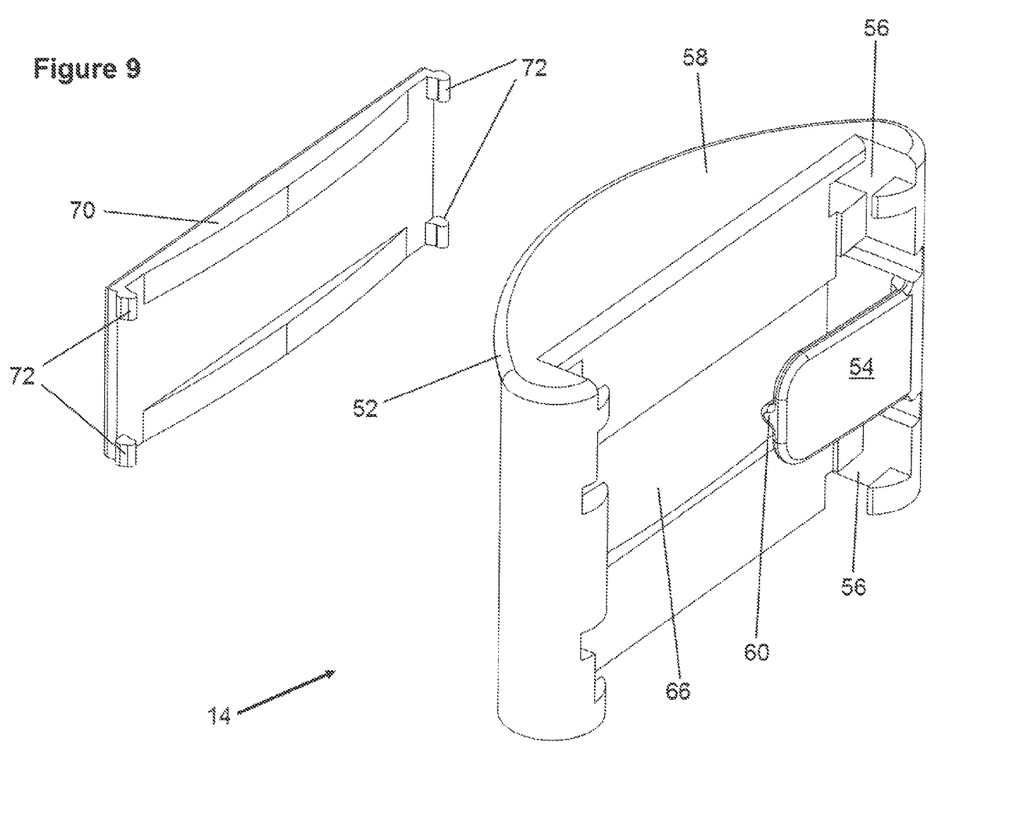
FIG. 9 is a rear perspective assembly view of the slider, according to one embodiment of the invention showing details of the removable cover plate.
Figure 10:
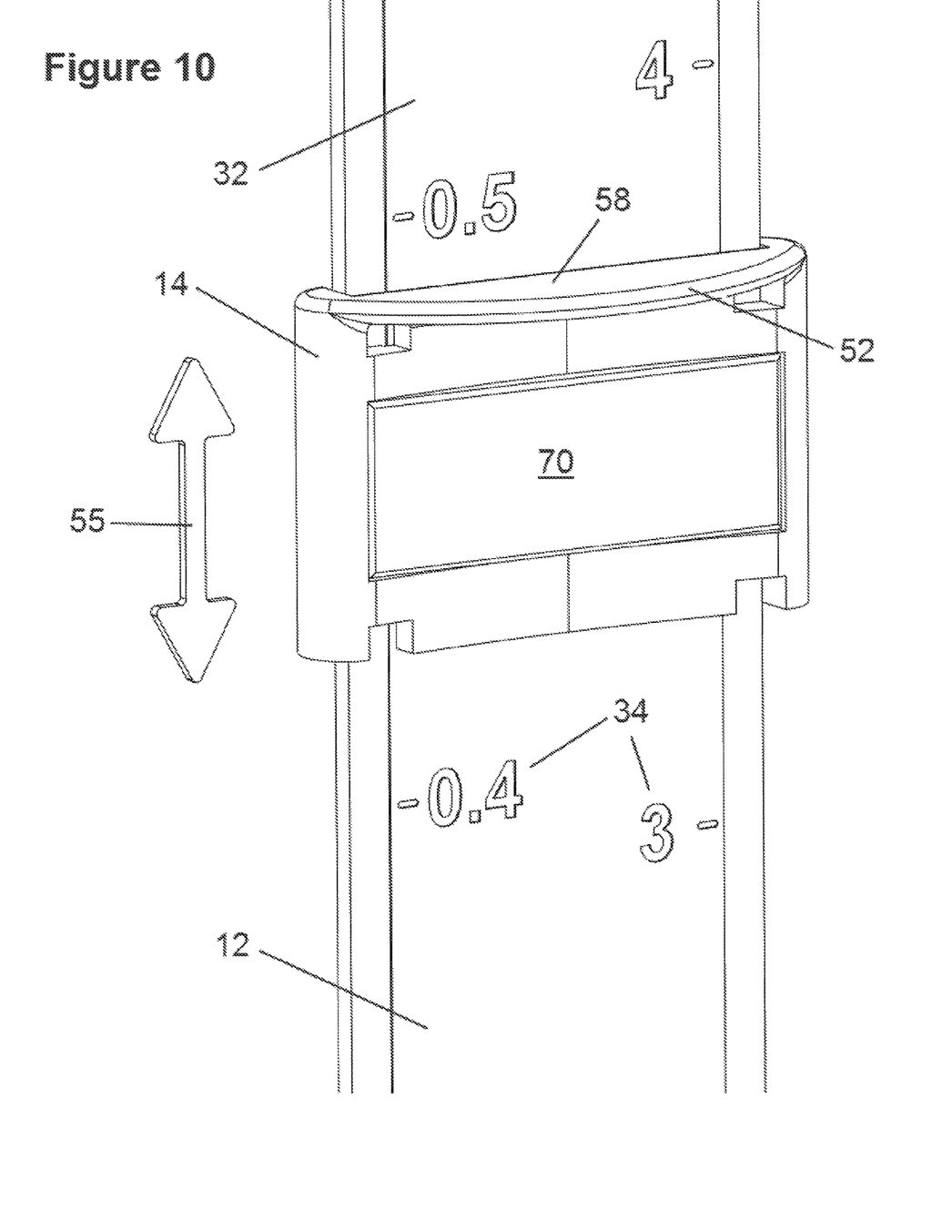
FIG. 10 is a perspective front view of the slider, shown slidingly attached to the body, according to one embodiment of the invention.
Figure 11:
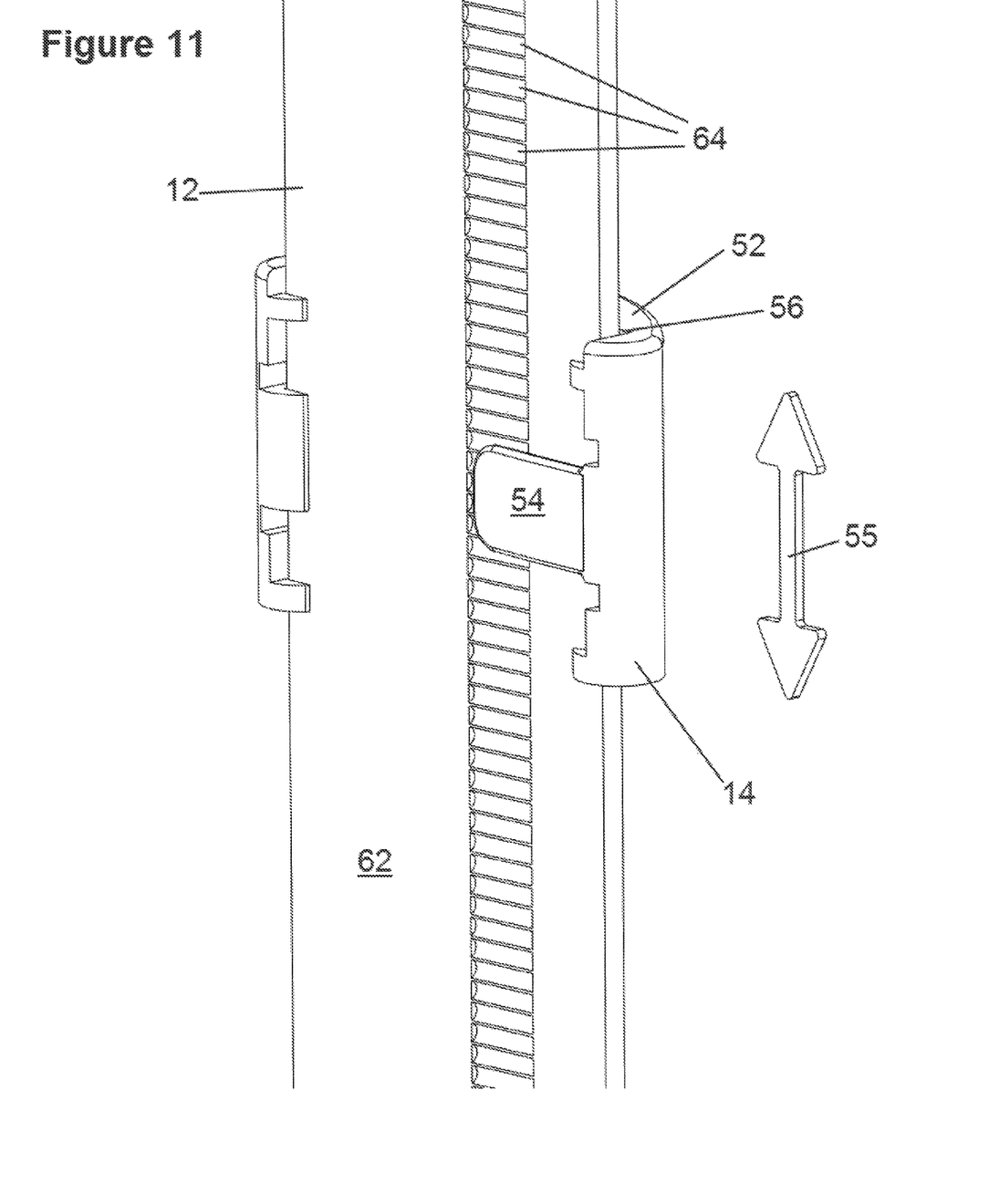
FIG. 11 is a perspective rear view of the slider, shown slidingly attached to the body, according to one embodiment of the invention, showing details of a plurality of detents.

Referring now to FIGS. 8-11, slider 14 is a structure that includes a frame 50 having a preferably integrally molded front lip 52, a rear tab 54, and a channel 56. Channel 56 is sized and shaped to slidingly fit about body 12, as shown in FIGS. 10 and 11. Slider 14 may be slid from lower end 22 to upper end 24, as desired by the user and as illustrated by arrows 55, shown in FIGS. 10 and 11. The user merely holds slider 14 in one hand and body 12 in the other and slides 14 along body 12 (in the directions of arrows 55) until a desired position is reached. As shown in FIG. 10, front lip 52 resides immediately adjacent to flat surface 32 and gauge marks 34 and includes an upper surface 58 which is meant to be used as an indicator of the desired volume of liquid sought by the user. In other words, the user slides slider 14 along body 12 until a desired gauge mark 34 aligns with upper surface 58 of lip 52.

According to the invention, and referring to FIGS. 8, 9 and 11, rear tab 54 is formed, again preferably integrally with slider 14 and includes at least one engagement tooth 60 (best shown in FIG. 8). Also, a rear surface 62 of body 12 includes a plurality of detents 64. Tooth 60 of tab 54 is sized, shaped and positioned to align and engage with detents 64. The interaction between tooth 60 and detents 64 provides interval points of stops along body 12 so that as slider 14 is moved up and down body 12, it will be encouraged to stop at any of the many detents 64, depending on which detent receives the tooth 60. The engagement between tooth 60 and detents 64 will create a clicking sound as slider 14 slides along body 12. The end result is that detents 64 and tooth 60 will help hold slider 14 in position along body 12, until a user moves slider by overcoming the engagement force between tooth 60 and detents 64. According to the invention, tab 54 is shaped and sized (and made from a material) which provides a spring-bias. The spring-bias permits tooth 60 to hop from one detent to another, as slider moves along body 12, as can be appreciated by those skilled in the art.

Applicant contemplates an embodiment wherein no detents 64 or tooth 60 are provided. Instead, tab 54 is sized and shaped to frictionally engage rear surface of body 12 so that slider 14 will hold its position until a user wants to move slider again. The user must overcome the relatively low friction force created between rear surface 62 and spring-biased tab 54 before slider will move. Once in a desired position, slider 14 will hold this position, even as gauge is moves around (into and out from bucket 16).

As shown in FIGS. 8 and 9, slider 14 further includes a front window 66 defining support ledges 68. A separate cover plate 70, which includes securement tabs 72 is sized and shaped to snap fit into engagement with slider 14, over window 66. Cover plate 70 is designed to contact support ledges 68 when pressed into slider 14. Tabs 72 are designed to mechanically engage with slider 14 and thereby hold cover plate 70 in place over window 66. The purpose of cover plate 70 is to hide window 66 (which provides access during the injection molding process to various structural components and features of slider 14—allowing for a desired and less expensive cavity to cavity type mold). Cover plate 70 may also be used to support informative indicia, instructions for use, and branding. Although preferred, cover plate 70 and window 66 are not required for the present invention to function. Also, slider 14 may be made without window 66 and cover plate 70, however Applicant understands that the required molding process will be more complicated and more expensive. To this end, the inclusion of window 66 and cover plate 70 are beneficial.

To use gauge 10 to fill a bucket 16 to a desired volume, a user holds gauge 10 in his or her hands and slides slider 14 along body 12 until lip 52 aligns with a desired gauge mark, for example, 3.25 gallons. Slider 14 will automatically hold this position as the user installs gauge 10 into an awaiting empty bucket 16. Installation is done by simply inserting body 12 down into bucket 16 along wall 18 until rim-holding arms 28 engage with rim 21 and rim-contacting surface 27 rests on top surface 42 of rim. Slider 14, still at the desired 3.25 gallon position (in this example), will be located inside bucket 16. The user now fills bucket 16 with the desired liquid (e.g., water) until the water level matches the upper surface 58 of lip 52, as shown in FIG. 5, wherein 74 represents the liquid level. The relatively large upper surface 58 of lip 52 allows the user to easily see when liquid level 74 reaches upper surface 58.

Gauge 10 may also be used to learn how much liquid is already present in bucket 16 simply by inserted gauge 10 into the bucket until rim-holding arms 28 engage with rim 21 and rim-contacting surface 27 rests on top surface 42 of rim. The user then slides slider 14 along body 12 until upper surface 58 of lip 52 matches the liquid level 74 in the bucket. The user may then remove gauge 10 (with slider 14 holding its position along body 12) and read the aligned gauge mark to determine the volume of liquid.

Gauge 10 may be made from any suitable material, including plastic, wood and metal, but an appropriate plastic material, such as ABS or PVC, or Polypropylene is preferred.

What is claimed is:

1. A portable fill-level indicator gauge for use with a container, said container being of the type having a side wall with an upper rim, and a bottom panel, said container defining a cavity into which a material defining both a first volume and an upper surface may be contained, said gauge comprising:

an elongated body having an upper end and a lower end and a writable surface therebetween, said writable surface allowing a plurality of graduation marks to be selectively written therealong, said graduation marks indicating prescribed fill-levels of material within said container;

a slider, selectively moveable along said elongated body, said slider having an indicator adapted to align with said graduation marks and being moveable along said elongated body so that when said gauge is positioned within said container, said slider is positionable so that said indicator aligns with said top surface of said material located within said container; and a hook structure located at said upper end of said elongated body, said hook structure being sized and shaped to selectively engage said rim of said container so that said material may be poured into said container until said upper surface of said material aligns with said written mark, thereby indicating that said fill-level of said material has been reached within said container, wherein said hook structure includes a spring-loaded clip that is sized and shaped to selectively clamp onto said side wall of said container adjacent said rim.

2. A portable fill-level indicator gauge for use with a container, said container having a side wall with an upper rim, and a bottom panel, said container defining a cavity into which a material may be contained, said material defining a volume and an upper surface, said gauge comprising:

an elongated body having an upper end and a lower end and a viewable surface therebetween, at least one graduation mark disposed on said viewable surface, said graduation mark conveying a prescribed fill-level within said container;

a hook structure located at said upper end of said elongated body, said hook structure being sized and shaped to selectively engage said rim of said container so that when said material is being added to said container, said upper surface of said material will align with at least one graduation mark, thereby indicating that the prescribed fill-level of material has been reached; and a slider having an indicator adapted to align with said at least one graduation mark and being selectively moveable along said elongated body so that when said gauge is positioned within said container, said slider is selectively moveable along said elongated body so that said indicator aligns with said top surface of said material located within said container.

3. The portable fill-level indicator gauge, according to claim 2, wherein said slider includes a channel into which said elongated body is slidingly received, allowing said slider to slide along said elongated body.

4. The portable fill-level indicator gauge, according to claim 3, wherein said slider slidingly engages said elongated body with a predetermined degree of friction so that said slider holds any given position along said elongated body, said predetermined degree of friction must be overcome by a user before said slider is displaceable along said elongated body to a new position.

5. The portable fill-level indicator gauge, according to claim 4, wherein said slider includes a spring-biased tab that is biased into frictional engagement with said elongated body.

6. The portable fill-level indicator gauge, according to claim 5, wherein said spring-biased tab includes an engagement tooth and wherein said elongated body includes at least one engagement detent located at a first position, said engagement tooth being sized, shaped and aligned to engage with said detent when said slider is located at said first positioned along said elongated body.

7. The portable fill-level indicator gauge, according to claim 6, wherein said at least one engagement detent aligns with said at least one graduation mark.

8. The portable fill-level indicator gauge, according to claim 6, wherein said at least one engagement detent is located on a rear surface of said elongated body and said spring-biased tab is located on a rear portion of said slider.

9. The portable fill-level indicator gauge, according to claim 2, wherein said indicator of said slider includes a flat surface that is generally parallel to said bottom panel of said container and generally parallel to said top surface of said material located within said container, said flat surface indicating to a user when said top surface of said material and said indicator align.

10. The portable fill-level indicator gauge, according to claim 2, wherein said hook structure includes a contact plate attached to said upper end of said elongated body, said contact plate includes two downwardly-directed rim-holding arms spaced a predetermined distance from said elongated body and defining a rim space therebetween, said rim space being sized and shaped to selectively receive said rim of said container so that said rim contacts said contact plate.

11. The portable fill-level indicator gauge, according to claim 10, wherein said rim-holding arms are spring-biased and curved towards said elongated body so that said rim-holding arms frictionally engage with said side wall of said container when said gauge is attached to said rim of said container and holds said gauge to said rim of said container.

12. The portable fill-level indicator gauge, according to claim 2, wherein said container is a bucket and wherein said at least one graduation mark conveys a predetermined volume of material located within said bucket.

13. The portable fill-level indicator gauge, according to claim 2, wherein said material is a liquid.

14. The portable fill-level indicator gauge, according to claim 13, wherein said at least one graduation mark conveys a predetermined number of liquid volume units.

15. The portable fill-level indicator gauge, according to claim 2, wherein said material is a granular solid.

16. The portable fill-level indicator gauge, according to claim 15, wherein said at least one graduation mark conveys a predetermined number of granular-solid volume units of said granular solid.

17. The portable fill-level indicator gauge, according to claim 2, wherein said at least one graduation mark conveys both a predetermined number of liquid volume units and granular-solid volume units of said material.

* * * * *